(No Model.)

E. COOK.
VEHICLE SPRING.

No. 465,992. Patented Dec. 29, 1891.

Witnesses:
Walter S. Wood
Edith Perkins

Inventor.
Eugene Cook
By Lucius C. West
Att'y.

UNITED STATES PATENT OFFICE.

EUGENE COOK, OF KALAMAZOO, MICHIGAN.

VEHICLE-SPRING.

SPECIFICATION forming part of Letters Patent No. 465,992, dated December 29, 1891.

Application filed March 14, 1891. Serial No. 385,044. (No model.)

*To all whom it may concern:*

Be it known that I, EUGENE COOK, a citizen of the United States, residing at Kalamazoo, county of Kalamazoo, State of Michigan, have invented a new and useful Vehicle-Spring, of which the following is a specification.

This invention relates to that class of vehicle-springs in which are employed side springs, one each side of the body and attached to the axles; and it has for its object a peculiarly-constructed spring-reach combined with said side springs, as more particularly described and claimed below.

Figure 1:
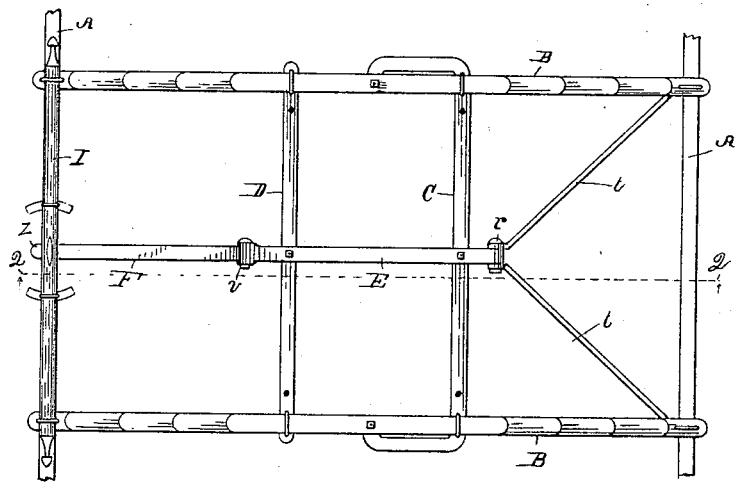
Figure 2:
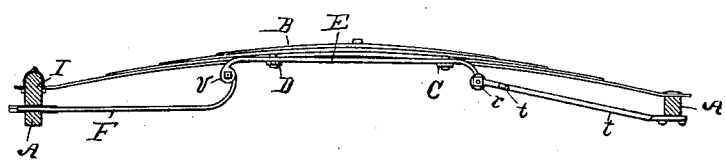

In the drawings forming part of this specification, Figure 1 is a plan view, and Fig. 2 is a section on line 2 2 in Fig. 1.

Referring to the lettered parts of the drawing, A A are the axles, B B the side springs attached thereto at the ends, and I is the forward bolster, all substantially as in ordinary constructions of this class. Between the two axles and separated from each other are two transverse bars C D, extending from one side spring B to the other and rigidly attached thereto.

The reach is composed of two brace-rods $tt$, attached to the rear axle, either rigidly or otherwise, and converging toward each other forward of said axle, and a spring-bar E, hinged at $r$ to said brace-rods and bolted rigidly to the transverse bars C D at the longitudinal center of the vehicle-gear; and the reach further consists of a spring-bar F, hinged at $v$ to the forward end of the spring-bar E by a hinge similar to the hinge which is employed in hinging the ends of the members together in an elliptic spring, and from thence extending forward and being attached between the forward axle and bolster by a king-bolt $z$. Of course the body of the vehicle in use is mounted upon the transverse bars C D, as in prior constructions.

In the operation, when the body and side springs move downward the elastic portions F E yield, and, owing to the hinge at $r$, the brace-rods $t$ tilt downward. During this action of course the rear axle turns in its bearings in the wheels as said axle moves rearward, allowing the side springs to lengthen. The yielding of the bars at the hinge $v$ imparts a similar action to the forward axle, besides giving that freedom to the elastic bars F E of the reach which they would not have if they were rigidly attached together.

Having thus described my invention, what I claim as new, and desire to secure by Letters Patent, is—

The combination, with the axles, side springs, transverse body-supporting bars, and rear brace-rods, of the elastic bar hinged to the brace-rods and extending from said hinge forward across said transverse bars, and the elastic bar hinged to the forward end of the first-named elastic bar and extending from said hinge to the forward axle, substantially as set forth.

In testimony to the foregoing I have hereunto subscribed my name in the presence of two witnesses.

EUGENE COOK.

Witnesses:
H. RICHARDSON,
EDITH PERKINS.